United States Patent
Ohta

(10) Patent No.: US 6,897,859 B2
(45) Date of Patent: May 24, 2005

(54) IMAGE PROCESSING APPARATUS FOR POLYHEDRON SHAPED OBJECTS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 597 days.

(21) Appl. No.: 09/986,654

(22) Filed: Nov. 9, 2001

(65) Prior Publication Data

US 2003/0007678 A1 Jan. 9, 2003

(30) Foreign Application Priority Data

Jul. 6, 2001 (JP) ...................................... 2001-206843

(51) Int. Cl.[7] ............................................. G06T 17/00
(52) U.S. Cl. ...................................... 345/419; 345/420
(58) Field of Search ............................... 345/419, 420, 345/428, 473, 474

(56) References Cited

U.S. PATENT DOCUMENTS

| | | | | |
|---|---|---|---|---|
| 4,646,251 A | * | 2/1987 | Hayes et al. | 345/423 |
| 5,506,947 A | * | 4/1996 | Taubin | 345/441 |
| 5,894,308 A | * | 4/1999 | Isaacs | 345/420 |
| 6,307,554 B1 | * | 10/2001 | Arai et al. | 345/423 |
| 6,556,198 B1 | * | 4/2003 | Nishikawa | 345/420 |

* cited by examiner

*Primary Examiner*—Mark Zimmerman
*Assistant Examiner*—Daniel F. Hajnik
(74) *Attorney, Agent, or Firm*—Nixon & Vanderhye P.C.

(57) ABSTRACT

There are provided a 3D-shape displaying program and an image processing apparatus which can display complicated three-dimensional objects by employing a distinctive data structure, and which allows the positional relationship between a specific point such as a character and a plane of a 3D-object to be easily grasped. A regular octahedron whose vertices are on one of the three-dimensional axes is used as a basic 3D-shape. Each of the eight planes of the regular octahedron is previously subdivided into a plurality of triangular regions, which are given specific ID numbers which can identify addresses in a memory. In the memory, a data storage area is previously secured for each ID number, where data such as a distance from the origin to each vertex of the triangle, a plane equation for the triangle, and a surface pattern are stored. Thus, for each triangle composing the basic regular octahedron, data for displaying the triangle is stored, so that it is easy to refer to the data on the basis of the ID numbers, and various 3D-shapes can be easily displayed by arbitrarily data alteration.

10 Claims, 9 Drawing Sheets

F I G. 4 A
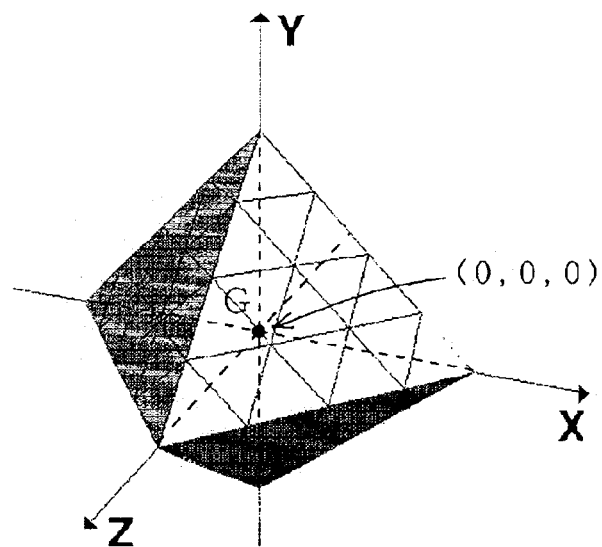
F I G. 4 B
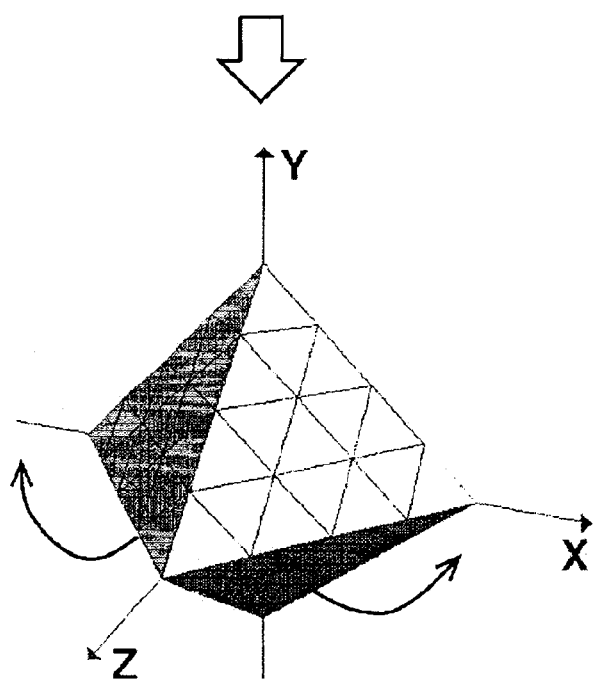

| AREA | 0 | 1 | 2 | 3 | 4 | 5 | 6 | 7 |
|---|---|---|---|---|---|---|---|---|
| ms | 0 | 15 | 55 | 56 | 112 | 127 | 71 | 72 |
| vx | 16 | 16 | -2 | 2 | -16 | -16 | -2 | 2 |
| vz | 2 | -2 | -16 | -16 | 2 | -2 | 16 | 16 |
| vy | 1 | -1 | -1 | 1 | 1 | -1 | -1 | 1 |

IMAGE PROCESSING APPARATUS FOR POLYHEDRON SHAPED OBJECTS

BACKGROUND OF THE INVENTION

1. Field of the Invention

The present invention relates to an image processing apparatus and a 3D-shape displaying program, and more particularly, an image processing apparatus for displaying a 3D-shape employing a distinctive data structure as well as a program to be executed by the apparatus.

2. Description of the Background Art

As is well known, various expressions of objects, e.g., movements or rotations, have been made easier in the field of graphics. Above all, in the realm of games, expressions have been used such that a character can freely move in a region (hereinafter referred to as a "game field") in which the character is allowed to move for game execution.

In general, this game field is represented as two-dimensional planes, and any objects formed on the planes, e.g., protrusions, are displayed on the basis of height information provided as attribute data of the plane coordinates. When a character moves in the game field, the height-wise position of a character is controlled with reference to the attribute data of the plane coordinates of a destination of a movement, thereby enabling the character to move along an object surface.

In recent years, there has been a desire for expressions of a game field which is displayed as a closed-surface 3D-object, e.g., the earth, such that a character can flexibly move along 3D-surfaces. This is tantamount to realizing game field expressions wherein continuing to proceed straight forward from a certain point results in returning to the same point.

However, according to the above-described conventional image processing technique, it is impossible to directly display a three-dimensional object because the game field is represented as two-dimensional planes. As for simple 3D-objects (e.g., hexahedrons), it may be possible to employ a pseudo-displaying method of joining a plurality of two-dimensional planes together. However, when this method is used, it would be necessary to subject the data of all two-dimensional planes to processing every time a character moves. Consequently, the processing time for obtaining the results would be increased and the processing time would vary, thus making this method impractical.

SUMMARY OF THE INVENTION

Therefore, an object of the present invention is to provide an image processing apparatus which is capable of displaying complicated three-dimensional objects (game fields, characters (eg. , enemy characters and buildings)) by employing a distinctive data structure, and which allows the positional relationship between a specific point such as a character and a plane of a 3D-object to be easily grasped; and a 3D-shape displaying program to be executed by the apparatus.

The present invention has the following features to attain the object above.

A first aspect of the present invention is directed to an image processing apparatus for outputting image data for displaying a desired 3D-shape composed of a plurality of polygons, comprising a storage section, a reading section, and an image data outputting section.

The storage section stores vector data defining a regular polyhedron which has a centroid at an arbitrary point in a space and each of whose faces is divided into a plurality of polygons and representing directions from the centroid toward vertices of the plurality of polygons, and for storing distance data for setting distances between the centroid and the vertices of the plurality of polygons of the desired 3D-shape. The reading section reads the vector data and the distance data from the storage section. The image data outputting section outputs image data for displaying an image of the desired 3D-shape such that the vertices of the plurality of polygons of the desired 3D-shape are points which are, from the centroid, at distances based on the distance data and in directions based on the vector data read from the reading section.

As described above, according to the first aspect, vector data and distance data are provided for each of the vertices of a plurality of polygons of a regular polyhedron. By arbitrarily altering the distance data, various 3D-shapes can be easily displayed.

It is preferable that the plurality of polygons into which each face of the regular polyhedron is divided have the same size and shape.

Thus, by ensuring that the plurality of polygons have the same size and shape, data management can be facilitated.

Moreover, it is preferable that the regular polyhedron is a regular octahedron.

Thus, by using a regular octahedron as the regular polyhedron, a quadrate can be formed when the regular polyhedron is unfolded, thereby facilitating data management.

Furthermore, it is preferable that a contact determination section for making, based on a distance of another object from the centroid and a distance from the centroid of a polygon to be subjected to contact processing on the desired 3D-shape, a contact determination between the desired 3D-shape and the other object is further comprised.

Thus, no matter how complicated the 3D-shape is, data concerning a polygon to be subjected to processing can be obtained through specific calculations from given space coordinate values. Therefore, contact determinations between an object located at given space coordinates and a polygon to be subjected to processing can be easily performed.

A second aspect of the present invention is directed to a program to be executed by a computer which is, for outputting image data for displaying a desired 3D-shape composed of a plurality of polygons, capable of reading data from a storage section for storing vector data defining a regular polyhedron which has a centroid at an arbitrary point in a space and each of whose faces is divided into a plurality of polygons and representing directions from the centroid toward vertices of the plurality of polygons, and for storing distance data for setting distances between the centroid and the vertices of the plurality of polygons of the desired 3D-shape, comprising a step of reading and a step of outputting.

In the step of reading, the vector data and the distance data are read from the storage section. In the step of outputting, image data for displaying an image of the desired 3D-shape is outputted such that the vertices of the plurality of polygons of the desired 3D-shape are points which are, from the centroid, at distances based on the distance data read and in directions based on the vector data read.

As described above, according to the second aspect, vector data and distance data are provided for each of the vertices of a plurality of polygons of a regular polyhedron.

By arbitrarily altering the distance data, various 3D-shapes can be easily displayed.

It is preferable that the plurality of polygons into which each face of the regular polyhedron is divided have the same size and shape.

Thus, by ensuring that the plurality of polygons have the same size and shape, data management can be facilitated.

Moreover, it is preferable that the regular polyhedron is a regular octahedron.

Thus, by using a regular octahedron as the regular polyhedron, a quadrate can be formed when the regular polyhedron is unfolded, thereby facilitating data management.

Furthermore, it is preferable that a step of making, based on a distance of another object from the centroid and a distance from the centroid of a polygon to be subjected to contact processing on the desired 3D-shape, a contact determination between the desired 3D-shape and the other object is further comprised.

In this case, it is preferable that the step of making a contact determination comprises: selecting, based on signs of space coordinate values of the other object, a face area of the regular polyhedron which includes a polygon to be subjected to contact processing, identifying the polygon to be subjected to contact processing from within the selected face area, by using a plane equation obtained from the distance data, and determining contact between the other object and the desired 3D-shape by comparing a distance of the identified polygon from the centroid and a distance of the other object from the centroid.

Thus, no matter how complicated the 3D-shape is, data concerning a polygon to be subjected to processing can be obtained through specific calculations from given space coordinate values. Therefore, contact determinations between an object located at given space coordinates and a polygon to be subjected to processing can be easily performed. As a result, it is possible to rapidly perform stable processing even in the case where a character continuously moves along 3D-surfaces. Moreover, the development of software for performing contact determinations with respect to complicated shapes can be facilitated.

A third aspect of the present invention is directed to a recording medium for recording a program to be executed by a computer for displaying a desired 3D-shape composed of a plurality of polygons, and data, wherein the recording medium has recorded thereon the following data and program:

vector data defining a regular polyhedron which has a centroid at an arbitrary point in a space and each of whose faces is divided into a plurality of polygons and representing directions from the centroid toward vertices of the plurality of polygons; distance data for setting distances between the centroid and the vertices of the plurality of polygons of the desired 3D-shape; a program for reading the vector data and the distance data from the storage section; and a program for outputting image data for displaying an image of the desired 3D-shape such that the vertices of the plurality of polygons of the desired 3D-shape are points which are, from the centroid, at distances based on the distance data read and in directions based on the vector data read.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A and FIG. 4B are views showing a basic 3D-shape employed in a 3D-shape displaying program according to one embodiment of the present invention.

DESCRIPTION OF THE PREFERRED EMBODIMENTS

An image processing apparatus provided by the present invention is to be used for graphics systems or game apparatuses which require polygon-based image displaying, and is realized by performing a distinctive process in cooperation with a CPU, memories, and like components thereof. Hereinafter, an image processing apparatus provided by the present invention and a 3D-shape displaying program to be executed by the apparatus will be described with reference to FIG. 1 to FIG. 14.

System Environment for Realizing the Present Invention

Figure 1:
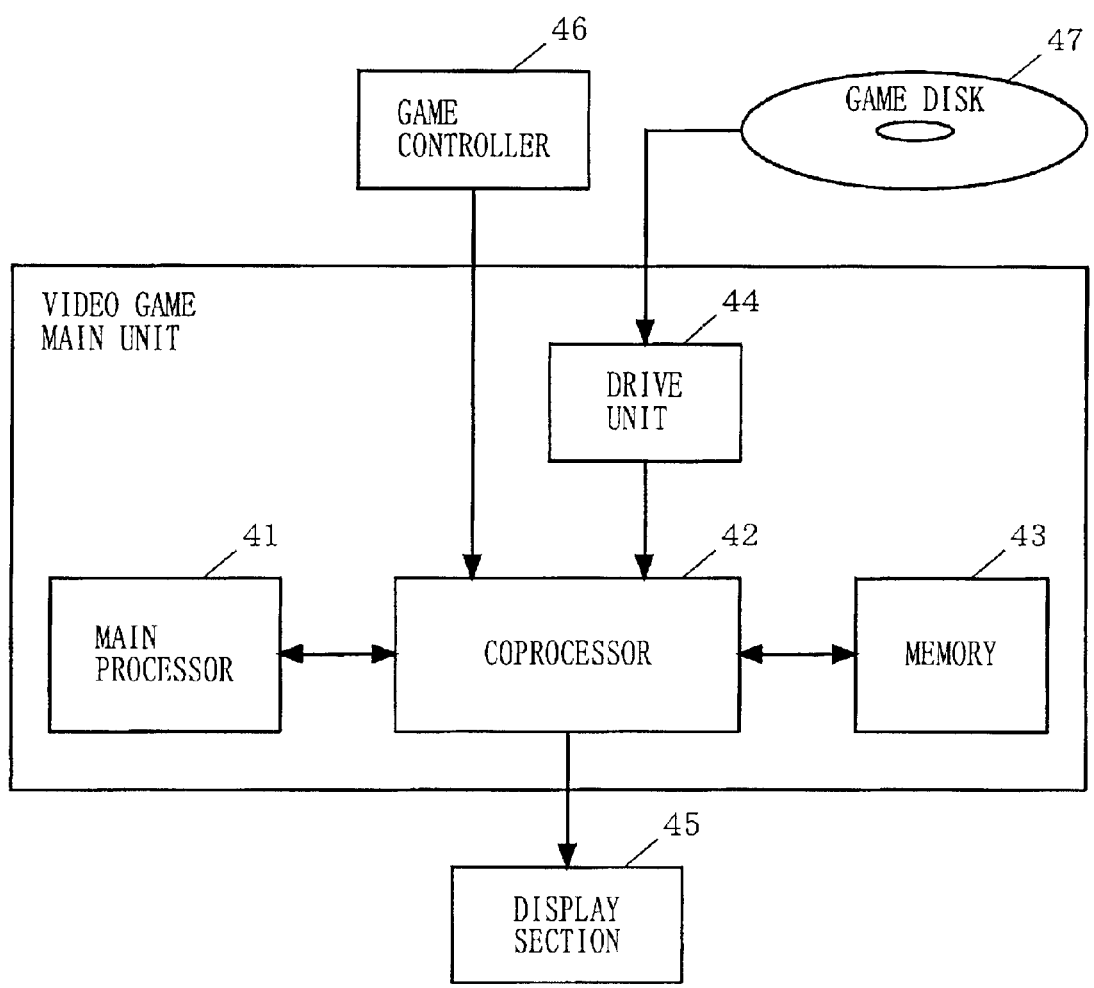
FIG. 1 is a block diagram illustrating an exemplary configuration of a video game system incorporating an image processing apparatus which executes a 3D-shape displaying program according to one embodiment of the present invention.
Figure 2:
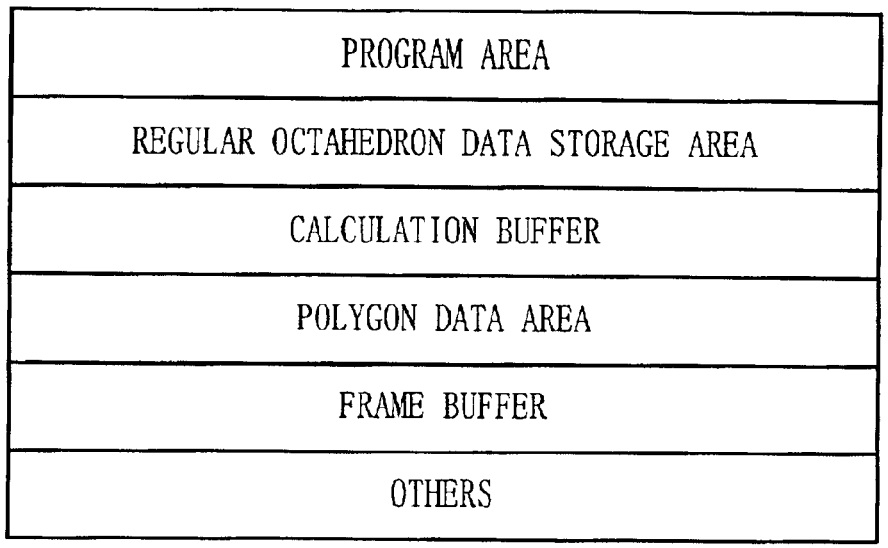
FIG. 2 is a chart illustrating an exemplary memory map of a memory 43 in FIG. 1.
Figure 3:
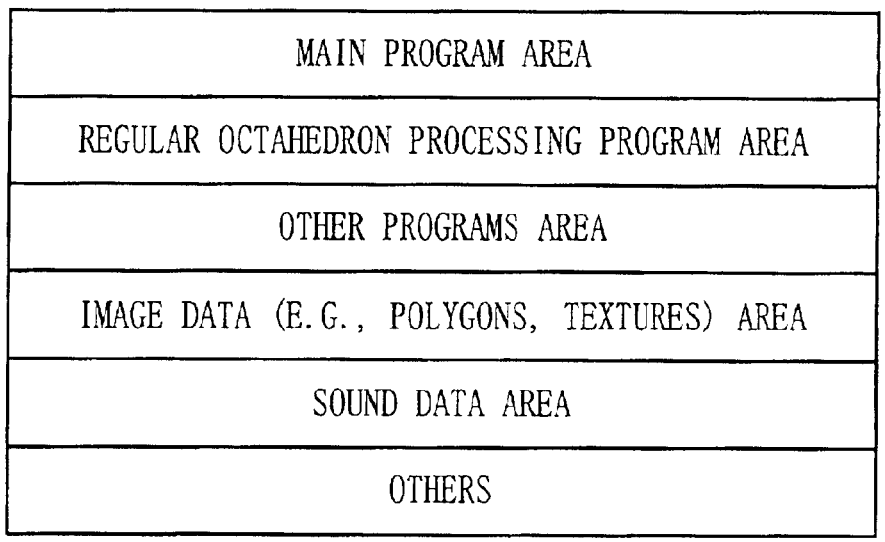
FIG. 3 is a chart illustrating an exemplary memory map of a game disk 47 in FIG. 1.

FIG. 1 is a block diagram illustrating an exemplary configuration of a video game system incorporating an image processing apparatus which executes the 3D-shape displaying program according to the present invention. In FIG. 1, the video game system is composed of a main unit comprising a main processor 41, a coprocessor 42, a memory 43, and a drive unit 44; a game controller 46; a display section 45; and a game disk 47.

The coprocessor 42 includes a bus control circuit which is responsible for bus control, a signal processor for performing shade processing and coordinate conversion for polygons and the like, and a drawing processor for rasterizing polygon data into an image to be displayed and converting it to a data format (dot data) storable in a frame memory (which are not shown). The coprocessor 42 is coupled to the drive unit 44 for driving the game disk 47 and the memory 43. Moreover, the coprocessor 42 is coupled to the display section 45 via a digital/analog converter (not shown) for outputting an audio signal and a video signal which have been processed by the main processor 41. The coprocessor 42 is also coupled to the game controller 46.

The bus control circuit converts commands which are supplied in the form of parallel signals from the main processor 41 via a bus into serial signals, and supplies the serial signals to the game controller 46. Moreover, the bus control circuit converts commands which are supplied in the form of serial signals from the game controller 46 into parallel signals, and outputs the parallel signals to the main processor 41. Data indicating states of operation, which is inputted from the game controller 46, is subjected to processing by the main processor 41 and temporarily stored in the memory 43, among other processes. A program stored on the game disk 47 and a program stored in the memory 43 are executed by the main processor 41 and the coprocessor 42 in response to operations which are inputted from the game controller 46. The results of execution are displayed by the coprocessor 42 on a screen of the display section 45.

In FIG. 1, the 3D-shape displaying program according to the present invention, which is stored in the memory 43 and the game disk 47, is executed in the coprocessor 42. The memory 43 stores a program and data as shown by a memory map of FIG. 2. The game disk 47, which is a recording medium such as a DVD, stores a program and data as shown by a memory map of FIG. 3.

In the memory 43, a program area stores basic system program for allowing the video game main unit to operate. A regular octahedron data storage area stores data concerning a regular octahedron, which is a basic 3D-shape as described later. A calculation buffer is a buffer used for various calculations. A polygon data area stores information concerning polygon data which is necessary for constructing one frame image. A frame buffer stores one frame of an image.

In the game disk 47, a main program area stores a basic program for allowing a game to operate. A regular octahedron processing program area stores a program for executing various processes using a regular octahedron as a basic 3D-shape as described below. An other programs area stores programs other than the main program. An image data area stores data concerning a regular octahedron as well as various data concerning polygons and textures which are necessary for displaying game graphics. A sound data area stores various data concerning sound expressions of a game.

Structure of 3D-Shape Data which is Stored

Next, with reference to FIG. 4 to FIG. 7, a data structure which is employed in the 3D-shape displaying program according to one embodiment of the present invention will be described.

According to the present invention, in a specific coordinate system whose origin is at an arbitrary point in a three-dimensional space, a regular octahedron having an origin is at its centroid G is used as a basic 3D-shape for displaying various 3D-shapes (FIG. 4A). This specific coordinate system has coordinate axes, which are radials radiating from the origin (centroid G) toward the respective vertices of the regular octahedron (i.e., vectors representing directions of the respective vertices from the origin). Each coordinate axis is used for the movement of a vertex of the regular octahedron which is on that axis. Each of the eight planes of the regular octahedron is previously subdivided into a plurality of triangular regions. In the case of a regular octahedron, the subdivided triangles are regular triangles. The vertices of the triangles are prescribed so as to be on the respective radials (coordinate axes) radiating from the origin (centroid G) Although FIG. 4A illustrates an example in which one plane is divided into 16 triangles, with each side being equally divided into four, the plane may be divided in any other number.

In the case where the origin of the specific coordinate system is not the origin of the game field (an orthogonal coordinate system), it is necessary to determine the origin of the specific coordinate system relative to the origin of the game field.

A specific ID number is set for each of the triangles into which each plane of the regular octahedron is divided. The ID number is set in the following manner.

Figure 5A:
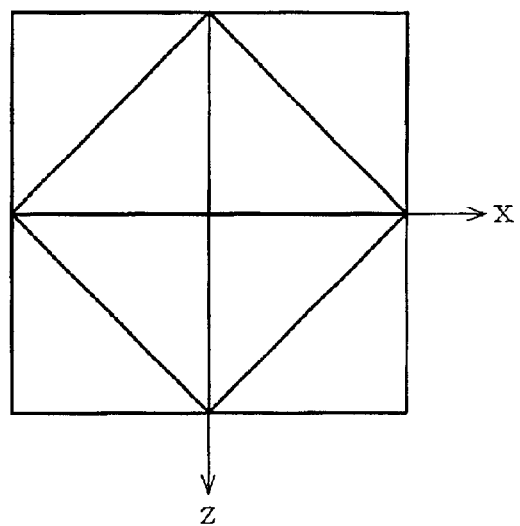
FIG. 5A and FIG. 5B are diagrams for explaining a data structure employed in a 3D-shape displaying program according to one embodiment of the present invention.
Figure 5B:
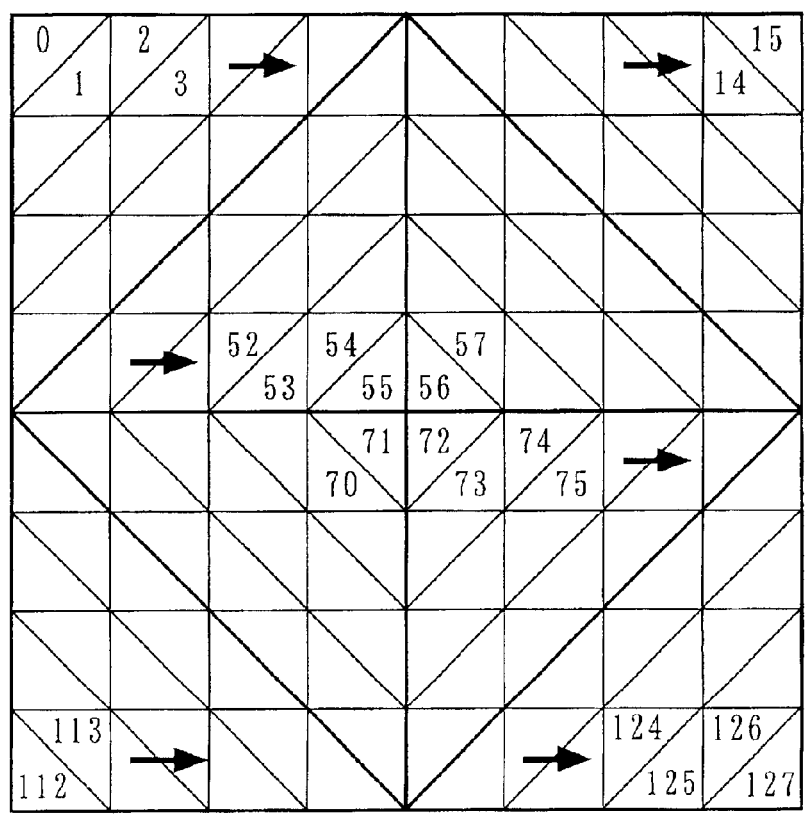
Figure 6A:
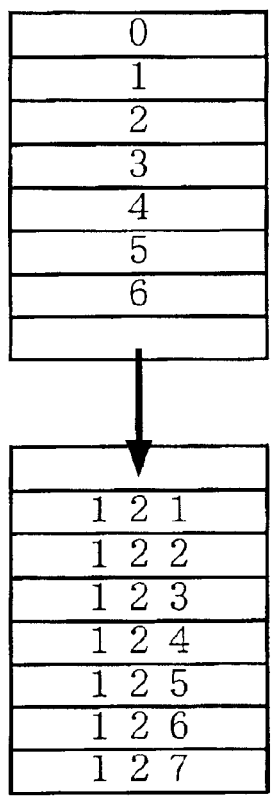
FIG. 6A is a chart for explaining a data structure employed in a 3D-shape displaying program according to one embodiment of the present invention.
Figure 6B:
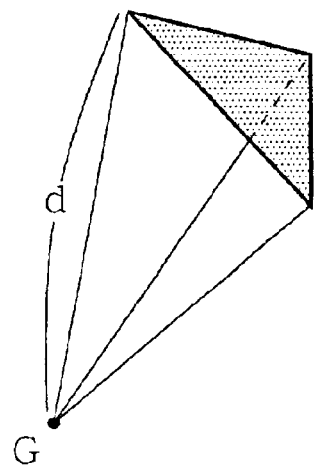
FIG. 6B is a diagram for explaining the notion of a distance d.

First, the four planes of the regular octahedron having a negative Y coordinate value are unfolded toward the positive value side (the solid arrows in FIG. 4B), so that the eight planes of the regular octahedron, as seen from above (i.e., the direction of the white arrow in the figure), are represented as a two-dimensional plane (FIG. 5A). Then, ID numbers (0 to 127) are given to the respective triangles (equilateral right triangle) on this two-dimensional plane, sequentially from upper left to lower right as shown in FIG. 5B. The ID numbers are information which can identify addresses in a storage device such as a memory. It can be seen that, on this two-dimensional plane, squares enclosed by vertical and horizontal lines are delineated based on the X and Z coordinate values, and that oblique lines within the squares are delineated based on the Y coordinate value. On the other hand, a data storage area is previously secured in the memory for each ID number (FIG. 6A), where data such as a distance d from the origin (centroid G) to each vertex of the triangle (FIG. 6B), a plane equation for the triangle, and a surface pattern are stored. It may be possible to derive the plane equation for the triangle from the distances d. By deriving the plane equation for the triangle from the distances d, the amount of data to be stored can be reduced, which is advantageous when the values of the distances d are varied flexibly.

Hence, it becomes possible, on the basis of the ID numbers, to refer to the data within the memory concerning each triangle composing the regular octahedron.

Figure 7:
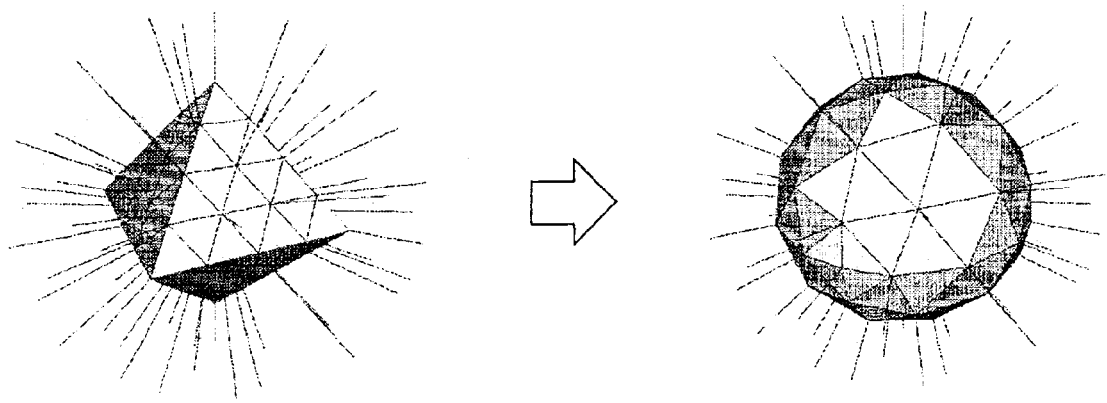
FIG. 7 is a view illustrating an exemplary 3D-shape which can be displayed by a 3D-shape displaying program according to one embodiment of the present invention.

Thus according to the present invention, for each of the triangles composing a basic regular octahedron, data for displaying that triangle is respectively stored. Therefore, 3D-objects of various shapes can be easily displayed by arbitrarily altering this data. In other words, according to the present invention, a 3D-shape is displayed by employing a specific coordinate system in which the vertices of a plane are defined by distances d from the centroid. As a result, the regular octahedron can be easily deformed simply by respectively moving the vertices of the triangles composing the regular octahedron along the coordinate axes in accordance with the distances d, whereby it becomes easily possible to display various 3D-objects. For example, a near-spherical 3D-object can be displayed by ensuring that the distances from the origin to the respective vertices of all of the triangles are equal (FIG. 7).

Execution Procedure of the 3D-Shape Displaying Program

Figure 8:
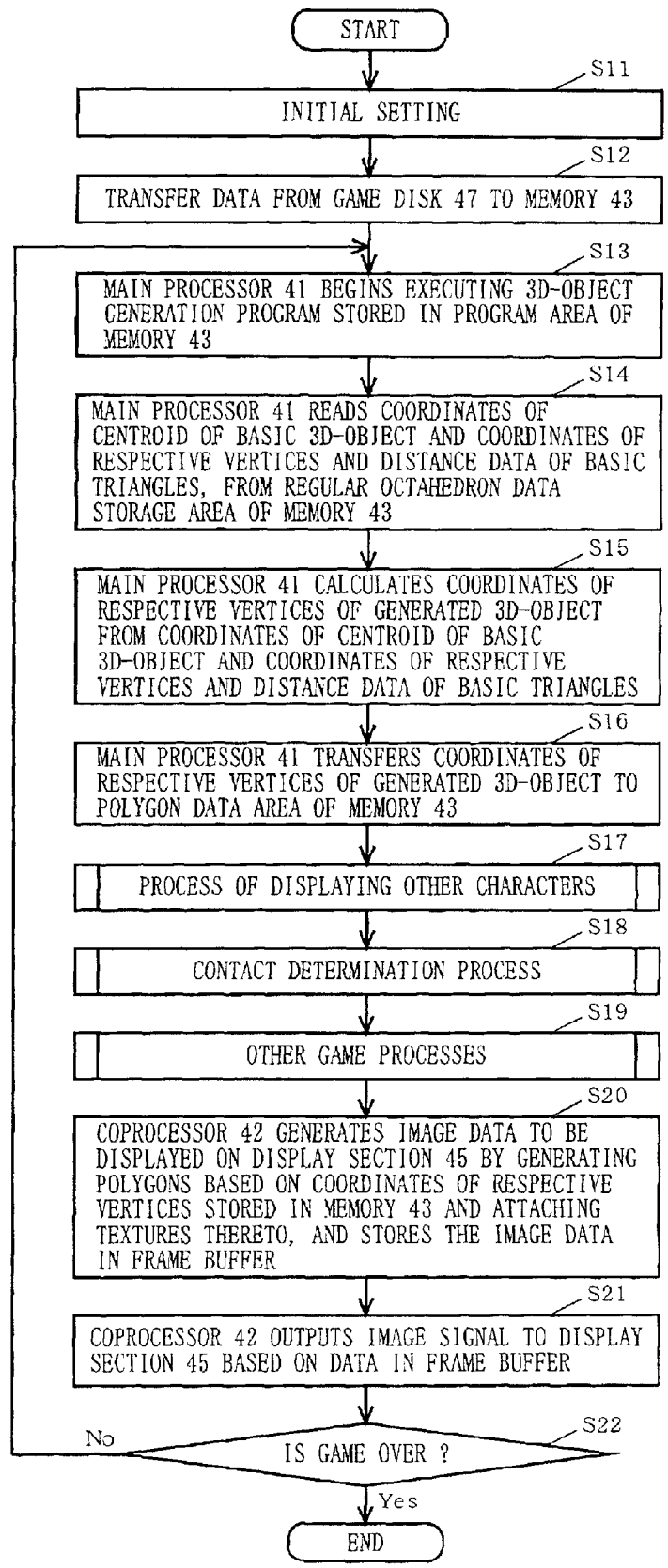
FIG. 8 is a flow chart for explaining a procedure in which a 3D-shape displaying program according to one embodiment of the present invention is executed on a video game system shown in FIG. 1.

Next, with reference to FIG. 8, it will be described how a 3D-shape displaying program employing the above-described data structure is executed on the video game system shown in FIG. 1, and how the 3D-object which is generated ("generated 3D-object") is displayed on the display screen.

First, initial setting is performed by a program which operates at the time of power activation (step S11) During the initial setting, it is detected whether or not the game disk 47 has been set, whether or not the game controller 46 is connected, etc. Once the initial setting is completed, necessary data are transferred from the game disk 47 to the memory 43 (step S12). Next, the main processor 41 begins executing the 3D-object generation program which is stored in the program area of the memory 43 (step S13). Then, the main processor 41 reads the coordinates of the centroid of a basic 3D-object and the coordinates of the respective vertices and distance data of basic triangles from the regular octahedron data storage area of the memory 43 (step S14), and calculates the coordinates of the respective vertices of a generated 3D-object from these coordinates and data (step S15) Then, the main processor 41 transfers the coordinates of the respective vertices of the generated 3D-object to the polygon data area of the memory 43 (step S16).

Thereafter, as necessary, the game system performs a process of displaying characters other than the generated 3D-object (step S17), a contact determination process between the generated 3D-object and the other characters as described below (step S18), and other processes related to the game, e.g., movements of characters, attack processing, and the like (step S19).

Next, the coprocessor 42 generates image data to be displayed on the display section 45 by generating polygons based on the coordinates of the respective vertices stored in the memory 43 and attaching textures to those polygons, and stores the image data in the frame buffer of the memory 43 (step S20). Finally, the coprocessor 42 outputs an image signal to the display section 45 based on the image data in the frame buffer (step S21). The processes from steps S13 to S21 are repeatedly performed until the game is over (step S22).

Determination of Positional Relationship Between an Arbitrary Point and a 3D-Shape Next, with reference to FIG. 9 to FIG. 14, a technique of determining the positional relationship between a 3D-object M which is displayed on the basis of the above-described 3D-shape data and an arbitrary point P(px,py,pz) in a space will be described. The 3D-object M and the point P may be of a relationship such as: 3D-object M=ground, point P=a foot sole of a character; 3D-object M=a building, point P=the belly of a character; or 3D-object M=a sphere in which a circus motor bike runs, point P=the motor bike.

Figure 9:
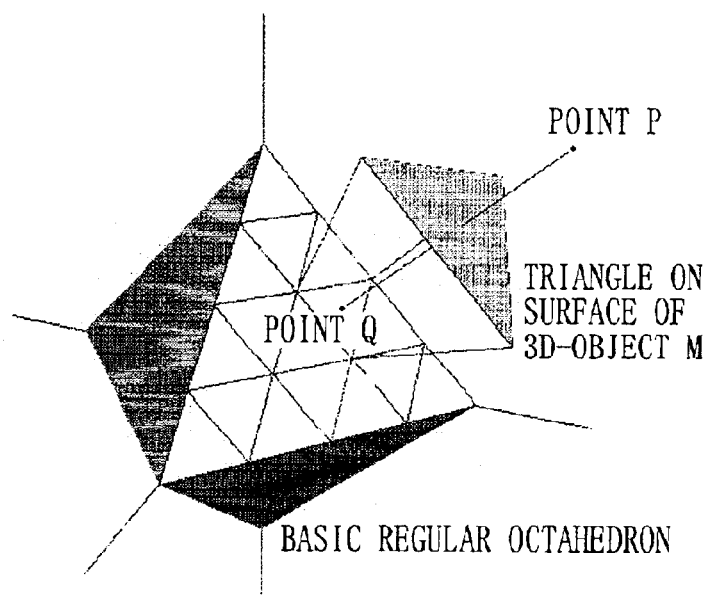
FIG. 9 is a view for explaining the concept of determining a positional relationship between an arbitrary point and a 3D-shape.

Among the aforementioned subdivided triangles on the 3D-object M plane, a triangle whose positional relationship with the point P in the space must be determined is identified based on the position of a point Q, which corresponds to the point P having been projected on the regular octahedron toward the origin (FIG. 9). Then, the plane equation for a 3D-object M surface can be derived from the current position data of the identified triangle. Hence, according to the present invention, a positional relationship determination is made as follows.

First, it is determined on which one of the eight planes of a regular octahedron (as the basic 3D-shape) the process of positional relationship determination with respect to the point P should be performed.

Figure 10:
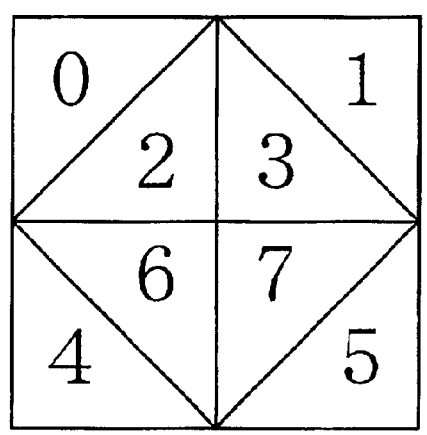
FIG. 10 is a diagram illustrating examples of previously-set area numbers.
Figures 11, 12:
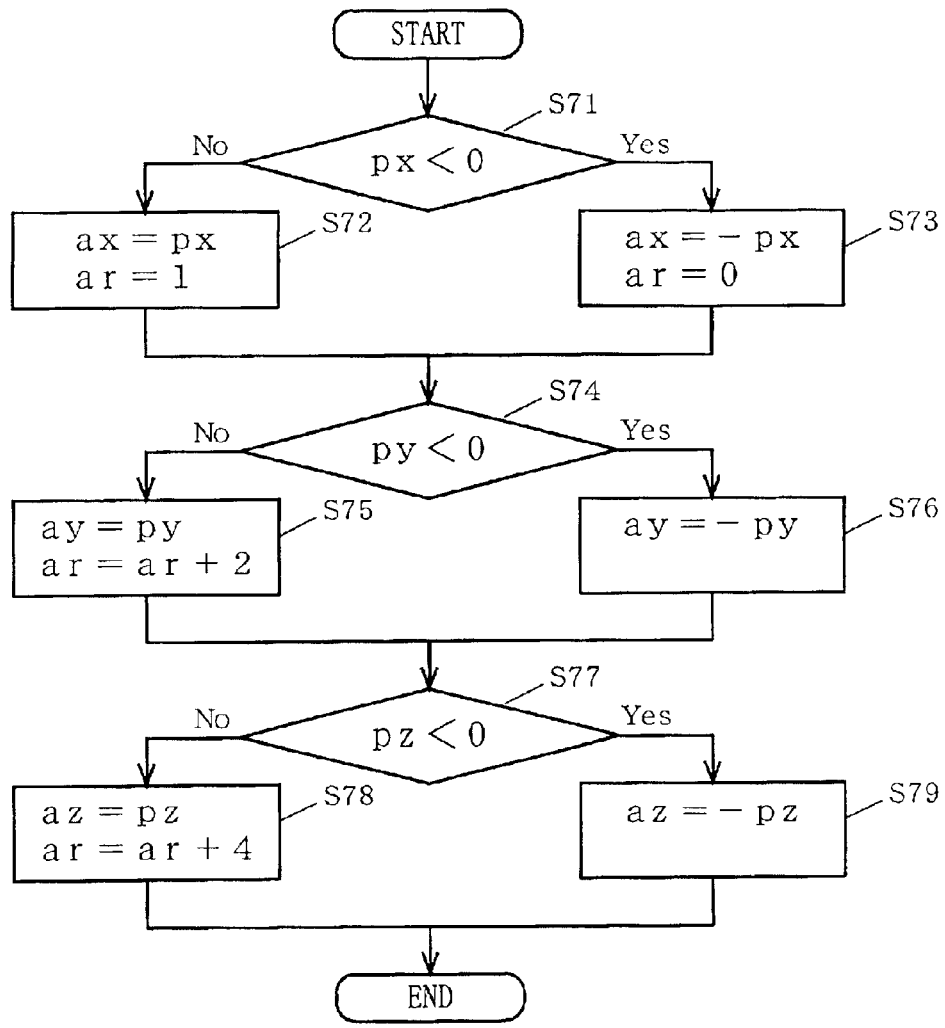
FIG. 11 is a chart illustrating an exemplary determination flow for identifying an area number.
FIG. 12 is a chart illustrating an exemplary correspondence table which is previously provided for identifying memory positions.
Figure 13:
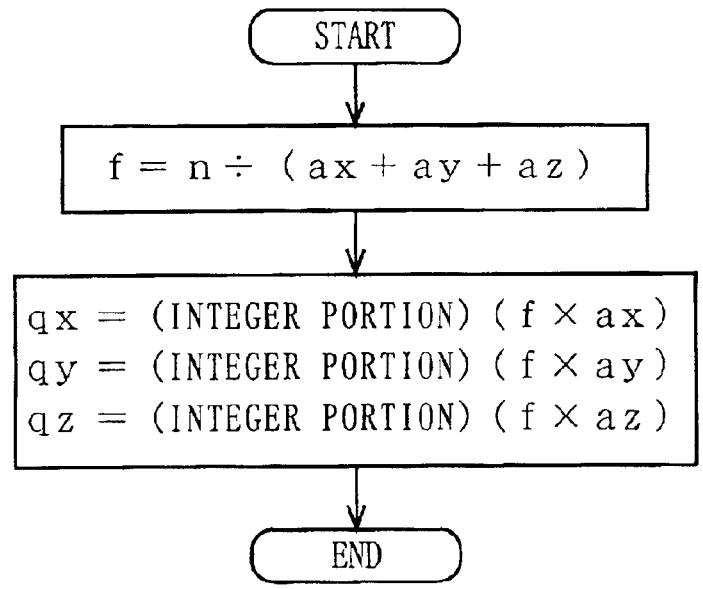
FIG. 13 and FIG. 14 are charts illustrating an exemplary process flow for identifying a memory position.

This determination is made as follows. First, as shown in FIG. 10, area numbers (0 to 7) are respectively set for the eight planes of the regular octahedron. In the example shown in FIG. 10, the area numbers are assigned according to the rules that: the value of the area number varies by one depending on a positive or negative sign of the X coordinate value; the value of the area number varies by two depending on a positive or negative sign of the Y coordinate value; and the value of the area number varies by four depending on a positive or negative sign of the Z coordinate value. Accordingly, a determination flow shown in FIG. 11 is executed in order to determine an area number ar of a plane to be subjected to processing, by using the signs of the X, Y, and Z coordinate values of the point P. For example, in the case of a point P whose only negative value is the z value, e.g., (px,py,pz)=(10,15,−8), px<0 is not satisfied (step S71, No), so step S72 is executed to give ar=1. Next, py<0 is not satisfied (step S74, No), so step S75 is executed to give ar=3(=1+2). Finally, pz<0 is satisfied (step S77, Yes), so step S79 is executed, whereby the area number ar=3 is determined. Note that the absolute values (ax,ay,az) of the point P(px,py,pz) are obtained concurrently with this determination flow.

Next, in accordance with the area number ar thus determined, a top position ms (i.e., the ID number of a triangle within the area which is in contact with the Y axis) in the data storage memory for the plane to be subjected to processing; a rate of change vx in position on the memory responsive to a change in the X coordinate of the point Q (i.e., amount of change in the ID number when the top position ms moves by one square along the X axis direction within the area); a rate of change vz in position on the memory responsive to a change in the Z coordinate of the point Q (i.e., amount of change in the ID number when the top position ms moves by one square along the Z axis direction within the area); and a triangle selection vector vy within the square based on the Y coordinate (i.e., amount of change in the ID number when moving from triangle to triangle within the square) are determined. These values are determined with reference to a correspondence table which is defined based on the ID numbers and the area number ar which have been set.

For example, in connection with the examples shown in FIG. 5B and FIG. 10, a correspondence table shown in FIG. 12 will be defined. With respect to area number 3 shown in FIG. 12, for instance, the memory top position ms is the ID number "56" of the triangle which is in contact with the Y axis. The rate of change vx in position is the amount of change "2 (=58−56)" when moving in the right direction (plus direction) on the X axis by one square. The rate of change vz in position is the amount of change "−16 (=40−56)" when moving in the upper direction (minus direction) on the Z axis by one square. The triangle selection vector vy is the amount of change "1 (=57−56)" when moving from triangle to triangle within the square. Note that, as for the values associated with area numbers 0,1,4, and 5 in this correspondence table, the rates of change in position are reversed between vx and vz because the directions of the X axis and the Z axis are switched when unfolded into a two-dimensional plane as shown in FIG. 5A. Moreover, since absolute values of coordinates are to be employed in the below-described calculation process, the signs in the correspondence table shown in FIG. 12 are prescribed on the premise that the coordinate values of the point Q to be derived are absolute values.

Next, the coordinates (qx,qy,qz) of the point Q are derived.

The coordinates of the point Q can be derived by resolving an equation for an intersection between a line connecting the point P and the origin and a plane to be subjected to processing of the regular octahedron. Since the signs of the coordinate values of the point P govern the subject plane (area number ar), absolute values (ax,ay,az) can be used for the calculation below. Therefore, the coordinates of the point Q will be given based on the absolute values of the coordinates of an intersection between the aforementioned line and the plane to be subjected to processing. Since square-by-square values are required as results, the values will be truncated after the decimal point. This process can be shown by a flow of FIG. 13. Note that a variable n is the number in which each side of a plane is equally divided, which is "4" in this example.

For example, in the case where the absolute values (ax,ay,az)=(10,20,15), it follows that:

$$f=4/(10+20+15)=4/45.$$

Therefore, the respective coordinate values of the point Q are:

$$qx=rd[f*10]=rd[0.88 \ldots ]=0$$

$$qy=rd[f*20]=rd[1.77 \ldots ]=1$$

$$qz=rd[f*15]=rd[1.33 \ldots ]=1$$

Note that rd[X] is a function which truncates X after the decimal point.

Finally, the ID number of a triangle onto which the point P is projected, i.e., the memory position mm at which data concerning the triangle is stored, is calculated as follows from the memory top position ms, the X-coordinate rate of change vx in position, the Z-coordinate rate of change vz in position, the triangle selection vector vy, and the coordinates of the point Q which have been derived.

Figure 14:
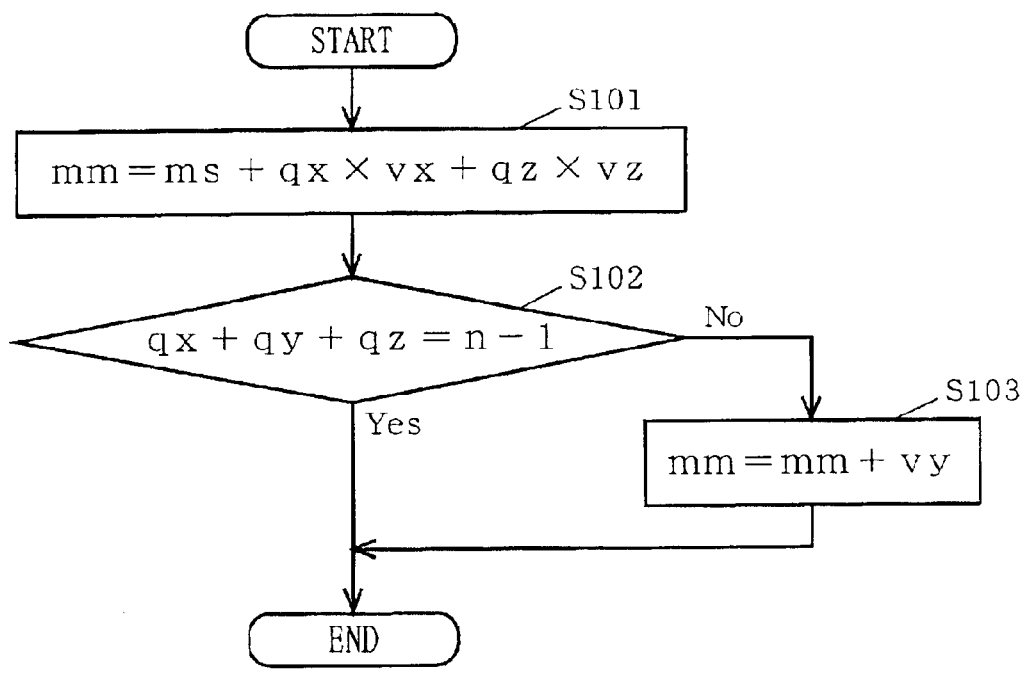

Referring to FIG. 14, first, values obtained by multiplying the X and Z coordinates of the point Q by the X-coordinate rate of change vx in position and the Z-coordinate rate of change vz in position are added to the memory top position ms, whereby the memory position of interest can be derived in a square-by-square manner (step S101). Then, either one of the triangles in the square is selected in accordance with a predetermined condition (step S102), whereby the memory position mm is determined (step S103).

For example, when all of the variables in the aforementioned example are applied, it follows that $$mm=56+0*2+1*(-16)=40$$

$$qx+qy+qz\neq n-1$$

$$mm=40+1=41.$$

Thus, memory position mm=41 is obtained.

Once the memory position mm has been derived, data concerning the triangle can be acquired therefrom to determine the positional relationship or contact with respect to the point P. For example, an intersection between the acquired surface equation of the triangle and a line connecting the coordinates of a reference point of a character (e.g., a foot sole) and the origin coordinates can be mathematically derived to make a contact determination. If the distance from the origin to the intersection is greater than the distance from the origin to the coordinates of the bottom of the foot, it can be determined that the character is in contact with the 3D-object M. Moreover, the shape of the 3D-object M can be freely changed by overwriting the acquired data concerning the triangle.

Thus, in accordance with an image processing apparatus and a 3D-shape displaying program in one embodiment of the present invention, the surface data of a 3D-object can be obtained from space coordinate values by using specific calculations, no matter how complicated the shape of the 3D-object may be. As a result, it is possible to rapidly perform stable processing even in the case where a character continuously moves along 3D-surfaces. Moreover, the development of software for performing contact determinations with respect to complicated shapes can be facilitated.

Although the above-described embodiment illustrates the case where the basic 3D-shape is a regular octahedron, similar implementations are possible by using other regular polyhedrons if slightly more complicated calculation processes can be tolerated.

Moreover, the above-described basic 3D-shape and deformed 3D-shape based thereon are figures which are merely employed for calculations, and will not actually be formed of polygons. It is images of polygons generated based on such 3D-shapes with textures attached thereon that will be displayed on the screen.

While the invention has been described in detail, the foregoing description is in all aspects illustrative and not restrictive. It is understood that numerous other modifications and variations can be devised without departing from the scope of the invention.

What is claimed is:

1. An image processing apparatus for outputting image data for displaying a desired 3D-shape composed of a plurality of polygons, comprising:

storage locations for storing vector data defining a regular polyhedron which has a centroid at an arbitrary point in a space and each of whose faces is divided into a plurality of polygons and representing directions from the centroid toward vertices of the plurality of polygons, and for storing distance data for setting distances between the centroid and the vertices of the plurality of polygons of the desired 3D-shape, a reading mechanism for reading the vector data and the distance data from the storage locations, and an image data outputting processing mechanism for outputting image data for displaying an image of the desired 3D-shape such that the vertices of the plurality of polygons of the desired 3D-shape are points which are, from the centroid, at distances based on the distance data and in directions based on the vector data read from the reading mechanism.

2. The image processing apparatus according to claim 1, wherein the plurality of polygons into which each face of the regular polyhedron is divided have the same size and shape.

3. The image processing apparatus according to claim 1, wherein the regular polyhedron is a regular octahedron.

4. The image processing apparatus according to claim 1, further comprising a contact determination processing mechanism for making, based on a distance of another object from the centroid and a distance from the centroid of a polygon to be subjected to contact processing on the desired 3D-shape, a contact determination between the desired 3D-shape and the other object.

5. A program to be executed by a computer which is, for outputting image data for displaying a desired 3D-shape composed of a plurality of polygons, capable of reading data from storage locations for storing vector data defining a regular polyhedron which has a centroid at an arbitrary point in a space and each of whose faces is divided into a plurality of polygons and representing directions from the centroid toward vertices of the plurality of polygons, and for storing distance data for setting distances between the centroid and the vertices of the plurality of polygons of the desired 3D-shape, comprising:

a step of reading the vector data and the distance data from the storage locations, and a step of outputting image data for displaying an image of the desired 3D-shape such that the vertices of the plurality of polygons of the desired 3D-shape are points which are, from the centroid, at distances based on the distance data read and in directions based on the vector data read.

6. The program according to claim 5, wherein the plurality of polygons into which each face of the regular polyhedron is divided have the same size and shape.

7. The program according to claim 5, wherein the regular polyhedron is a regular octahedron.

8. The program according to claim 5, further comprising a step of making, based on a distance of another object from the centroid and a distance from the centroid of a polygon to be subjected to contact processing on the desired 3D-shape, a contact determination between the desired 3D-shape and the other object.

9. The program according to claim 8, wherein the step of making a contact determination comprises:

a step of selecting, based on signs of space coordinate values of the other object, a face area of the regular polyhedron which includes a polygon to be subjected to contact processing, a step of identifying the polygon to be subjected to contact processing from within the selected face area, by using a plane equation obtained from the distance data, and a step of determining contact between the other object and the desired 3D-shape by comparing a distance of the identified polygon from the centroid and a distance of the other object from the centroid.

10. A recording medium for recording a program to be executed by a computer for displaying a desired 3D-shape composed of a plurality of polygons, and data, wherein the recording medium has recorded thereon:

vector data defining a regular polyhedron which has a centroid at an arbitrary point in a space and each of whose faces is divided into a plurality of polygons and representing directions from the centroid toward vertices of the plurality of polygons, distance data for setting distances between the centroid and the vertices of the plurality of polygons of the desired 3D-shape, a program for reading the vector data and the distance data from the storage locations, and a program for outputting image data for displaying an image of the desired 3D-shape such that the vertices of the plurality of polygons of the desired 3D-shape are points which are, from the centroid, at distances based on the distance data read and in directions based on the vector data read.

* * * * *